US00RE43105E

(19) United States
(12) Reissued Patent
Kurokawa et al.

(10) Patent Number: US RE43,105 E
(45) Date of Reissued Patent: Jan. 17, 2012

(54) TRACKING ERROR DETECTION METHOD AND OPTICAL DISC REPRODUCTION APPARATUS USING THE SAME

(75) Inventors: Takahiro Kurokawa, Fujisawa (JP); Harukazu Miyamoto, Higashimurayama (JP)

(73) Assignee: Hitachi, Ltd., Tokyo (JP)

(21) Appl. No.: 13/064,303

(22) Filed: Mar. 17, 2011

Related U.S. Patent Documents

Reissue of:
(64) Patent No.: 7,764,578
Issued: Jul. 27, 2010
Appl. No.: 11/674,230
Filed: Feb. 13, 2007

(30) Foreign Application Priority Data

Dec. 15, 2006 (JP) ..... 2006-338852

(51) Int. Cl.
*G11B 7/00* (2006.01)

(52) U.S. Cl. ..... 369/44.41; 369/124.12

(58) Field of Classification Search ..... 369/44.41, 369/124.12, 44.27, 44.28, 44.34, 44.42, 44.25, 369/44.29, 124.01, 124.05, 120, 121, 122, 369/116, 59.11, 59.12
See application file for complete search history.

(56) References Cited

U.S. PATENT DOCUMENTS

| | | | |
|---|---|---|---|
| 6,388,964 | B2 | 5/2002 | Watabe |
| 7,518,963 | B2 | 4/2009 | Tokuyama |
| 2003/0016600 | A1 | 1/2003 | Hiratsuka |

OTHER PUBLICATIONS

White paper: Blu-ray Disc Format—General, Aug. 2004.
DVD Forum: Technical White Paper—Outline Of HD DVD formats; DVD forum, Dec. 2005, Revised Jun. 2006.

*Primary Examiner* — Nabil Hindi
(74) *Attorney, Agent, or Firm* — Antonelli, Terry, Stout & Kraus, LLP.

(57) ABSTRACT

An object of the present invention is to improve a conventional DPD method having a problem that a tracking servo becomes unstable due to a reduction in the accuracy of detecting a phase difference between short mark signals at an edge, in a case where the amplitudes of the short mark signals are very small, or where a readout signal contains large noise. To this end, the present invention provides a method for increasing the contribution ratio of long mark signals to generate a tracking error signal by causing a phase difference pulse to include information on a phase difference, and by causing the area of the pulse to be weighted according to the length of a mark/space adjacent to a concerned edge.

14 Claims, 8 Drawing Sheets

(CONVENTIONAL EXAMPLE)

(CONVENTIONAL EXAMPLE)

(CONVENTIONAL EXAMPLE)

| A | B | Out |
|---|---|---|
| H | H | 0 |
| L | H | 0 |
| H | L | 0 |
| L | L | 0 |

| A | B | Out |
|---|---|---|
| H | H | D |
| L | H | 0 |
| H | L | 0 |
| L | L | 0 |

p-q

FIG. 9

| | | INFORMATION CONTAINED IN PULSE HEIGHT | INFORMATION CONTAINED IN PULSE WIDTH |
|---|---|---|---|
| CONVENTIONAL DPD METHOD | | — | PHASE DIFFERENCE |
| PRESENT INVENTION | FIRST METHOD | PHASE DIFFERENCE<br>MARK LENGTH | PHASE DIFFERENCE |
| | SECOND METHOD | PHASE DIFFERENCE<br>MARK LENGTH | MARK LENGTH |

TRACKING ERROR DETECTION METHOD AND OPTICAL DISC REPRODUCTION APPARATUS USING THE SAME

Matter enclosed in heavy brackets [ ] appears in the original patent but forms no part of this reissue specification; matter printed in italics indicates the additions made by reissue.

CLAIM OF PRIORITY

The present application claims priority from Japanese application JP 2006-338852 filed on Dec. 15, 2006, the content of which is hereby incorporated by reference into this application.

BACKGROUND OF THE INVENTION

1. Field of the Invention

The present invention relates to a tracking error detection method allowing a stable tracking servo to be achieved in an optical disc reproduction apparatus even during reproduction of data on a high density disc or during high-speed reproduction, and relates to an optical disc reproduction apparatus using the method.

2. Description of the Prior Art

An optical disc known as a CD (Compact Disc) and a DVD (Digital Versatile Disc) is an information recording medium which is used for recording and reproducing information by means of an optical spot formed by concentrating laser light on the information recording surface of the disc. A BD (Blu-ray Disc) or an HD DVD is one of discs that have recently put into practical use as a high density optical disc. The Blu-ray Disc is described in details in "White Paper: Blu-ray Disc Format-General," and the HD DVD is described in details in "DVD Forum Gijyutsu Hakusho—HD DVD Format no Gaiyou—(DVD Forum Technology White Paper—Outline of HD DVD Format—)."

In a case of a reproduction-only optical disc (ROM: Read Only Memory), information is recorded in the form of fine convexoconcaves (pits) formed on the information recording surface, and the information is reproduced by detecting the change in the reflectance of light caused by the presence and absence of pits. The pits are aligned spirally or concentrically, and thus form a recording track.

When information is reproduced, it is necessary to cause the optical spot to follow a recording track precisely (perform tracking). The tracking is performed by causing optical means to detect the amount of deviation (a tracking error) of the optical sport from the center of a recording track, and by driving an objective lens in a radial direction of the disc so that the tracking error would be zero.

There are a 3-spot method, a DPD (Differential Phase Detection) method and the like as a tracking error detection method for reproduction-only optical discs. The DPD method is often used in recent driver apparatuses in order to handle a plurality of types of disc standards, since the DPD method can eliminate the influence of the difference between track pitches.

A fundamental principle of the tracking error detection using the conventional DPD method will be described by using FIG. 1. FIG. 1 shows states of pits, optical spots, and light intensity distribution on a quadrant photo detector when information in a reproduction-only disc is reproduced. When an optical spot is on a pit, the 0th-order diffracted light and the ±1st-order diffracted light among all the orders of diffracted lights generated by the pit interfere with each other, and this interference generates areas (interference areas) with the small light intensity on the quadrant photo detector.

In this respect, assuming that segment elements of the quadrant photo detector are A, B, C and D, an examination is given on the sums $(I_A+I_C)$ and $(I_B+I_D)$ each of which is the sum of the output currents from two segment elements located at diagonal corners, respectively. In a case where the optical spot passes exactly through the center of the pit column, no phase difference occurs between $(I_A+I_C)$ and $(I_B+I_D)$. On the other hand, when the optical spot is deviated from the centerline of the pit column (off-track), a phase difference occurs between $(I_A+I_C)$ and $(I_B+I_D)$. This is because the above-described interference areas are generated as a pair at the respective diagonal corners of the quadrant photo detector, when the optical spot passes on an edge of the pit (a front or rear end of the pit in the direction of optical spot's movement). As shown in FIG. 1, the sign of phase difference varies according to off-track directions, and the size of phase difference is approximately proportional to the off-track amount.

Hereinafter, an example of the tracking error signal generating method using the conventional DPD method will be described by using a block diagram of FIG. 2 and a diagram of signal waves of FIG. 3. The diagonal sum signals $(I_A+I_C)$ and $(I_B+I_D)$ are amplified by the respective amplifiers, and thus become A1 and A2, respectively. The amplitudes of short mark signals of the A1 and A2 are relatively amplified by the respective equalizers. Subsequently, the signals are binarized by the respective level comparators, and thus become signals B1 and B2, respectively. The signals B1 and B2 are inputted to a phase comparator, and the phase comparator detects the phase difference between edges of the two signals (an edge is a point where each of the signals crosses over the zero level). The phase comparator outputs a phase difference pulse to C1 when the phase of the signal B1 precedes the phase of the signal B2. On the other hand, the phase comparator outputs a phase difference pulse to C2 when the phase of the signal B2 precedes the phase of the signal B1. The heights of the phase difference pulses are constant, and the widths thereof are equal to the absolute value of the phase difference between the signals B1 and B2. The pulse signals of each of C1 and C2 are integrated with a predetermined time constant by the respective low-pass filters (LPF), and the difference between the signals thus obtained becomes a tracking error signal.

SUMMARY OF THE INVENTION

A problem in tracking error detection using the conventional DPD method will be pointed out here. FIG. 4 is a schematic diagram of a readout signal of a reproduction-only optical disc. In this example, pits aligned in the order of 8T marks, 2T spaces, 2T marks and 8T spaces are reproduced. Here, T denotes a channel bit cycle. In a case of a long mark readout signal such as 8T, the gradient is large at the edge. In contrast, in a case of a short mark readout signal such as 2T, the gradient is small at the edge, since the signal amplitude is reduced due to insufficient optical resolution. In particular, in a case of a high density optical disc such as BD (Blu-ray Disc) and HD DVD which have been recently put into practical use, the gradient of a signal is small at the edge because the amplitude of a short mark signal is very small. For this reason, the influence of noise, variation in a signal level and the like results in a reduction in the accuracy of phase difference detection, and the reduction in the accuracy causes tracking servo to be unstable.

Moreover, in a case where data is reproduced at a high speed, the amplitude of a short mark signal with high frequency is decreased due to the limit of a signal transmission band of an electric circuit in a driver apparatus, and this decrease brings about the same problem as that in a case of the reproduction of data on a high density optical disc.

Any type of main optical discs (CD, DVD, BD and HD DVD), which have been put into practical use, employs a mark edge recording method. In this method, in order to increase recording capacity by enhancing the efficiency in data recording, data is modulated so that the existence ratio of signals with shorter mark length would be larger than that of signals with longer mark length, and then the data thus modulated is recorded. In other words, the ratio of the number of edges of short mark signals to the total number of edges of a readout signal is high.

Accordingly, in the case of the tracking error detection method using the conventional DPD method, the contribution ratio of edges of short mark signals to generate a tracking error signal is high, and there is a problem that the tracking servo becomes unstable in reproducing data on a high density optical disc or reproducing at a high speed for the aforementioned reasons.

Against this background, an object of the present invention is to provide a tracking error detection method and an optical disc reproduction apparatus using the method, by using the method it being possible to reduce the influence of unstable short mark signals at edges, thereby achieving a stable tracking servo.

In the present invention, a tracking error signal is generated by using the following method. In the present invention, specifically, for the purpose of reducing the contribution ratio of short mark signals at edges to generate a tracking error signal, and of increasing the contribution ratio of long mark signals at edges, the height or width of a phase difference pulse outputted in a process for generating a DPD tracking error signal is weighted according to the length of a mark/space adjacent to a concerned edge. In other words, the height or the width of a phase difference pulse is made larger as the length of a mark/space adjacent to a concerned edge is longer. In the DPD method, a tracking error signal is the one obtained by integrating phase difference pulses with a predetermined time constant. For this reason, by employing the foregoing method, the contribution ratio of long mark signals at edges to generate a tracking error signal can be relatively increased.

Two possible methods for achieving the present invention are as follows.

(1) A First Method: a Method in which the Height of a Phase Difference Pulse is Weighted According to the Gradient of a Signal at a Concerned Edge In this method, the height of a phase difference pulse is made approximately proportional to the gradient of a signal at a concerned edge. As has been described, the longer the length of a mark/space adjacent to a concerned edge, the larger the gradient of a signal at an edge. For this reason, the height of a phase difference pulse is changed so that a phase difference pulse at an edge of a signal with a longer mark, which is a more stable signal, would have the higher height.

(2) A Second Method: a Method in which the Width of a Phase Difference Pulse is Weighted According to the Length of a Mark/Space Following a Concerned Edge In this method, a phase difference pulse having the width equal to the length of a mark/space is outputted. In other words, a phase difference pulse is outputted during a period from an edge to the immediately subsequent edge. In this way, a phase difference pulse starting from an edge of a long mark signal has the larger width than a phase difference pulse starting from an edge of a short mark signal. In this case, however, a phase difference pulse does not include information on the phase difference if the height of a phase difference pulse is set constant. In order to avoid this, the height of a pulse is also made approximately proportional to the gradient at an edge as is the case with the first method.

FIG. 9 shows a summary of the tracking error signal generating methods of the present invention, which have been described above, in terms of information contained in the height and the width of a phase difference pulse.

In the case of the conventional DPD method, the height of a pulse does not contain any information, since the height is constant. The width of a pulse indicates a phase difference, as it is, between signals A1 and A2.

In the case of the first method, that is, the method in which the height of a phase difference pulse is weighted according to the gradient of a signal at a concerned edge, the height of a pulse contains information on a phase difference between signals A1 and A2, and information on the mark length. The width of a pulse indicates a phase difference, as it is.

In the case of the second method, that is, the method in which the width of a phase difference pulse is weighted according to the length of a mark/space following a concerned edge, the width of a pulse indicates the length of the mark/space, as it is, and the height of a pulse contains the same information as that in the first method.

As has been described, in both of the first and second methods, a phase difference pulse is made to contain information on a phase difference, and the area of a pulse is weighted according to the length of a mark/space adjacent to a concerned edge. Thus, the contribution ratio of long mark signals at edges to generate a tracking error signal is increased, and thereby the foregoing problem of the accuracy of detecting a phase difference in the conventional DPD tracking method is solved.

According to the present invention, a tracking error signal becomes stable, and thus a stable tracking servo can be performed even during reproduction of data on a high density disc, or during high-speed reproduction.

BRIEF DESCRIPTION OF THE DRAWINGS

FIG. 9 is a table showing relationships between tracking error signal generating methods and information included in the heights and the widths of phase difference pulses.

DESCRIPTION OF THE PREFERRED EMBODIMENTS

Hereinafter, descriptions will be given of embodiments of the present invention.

First Embodiment

Figure 5:
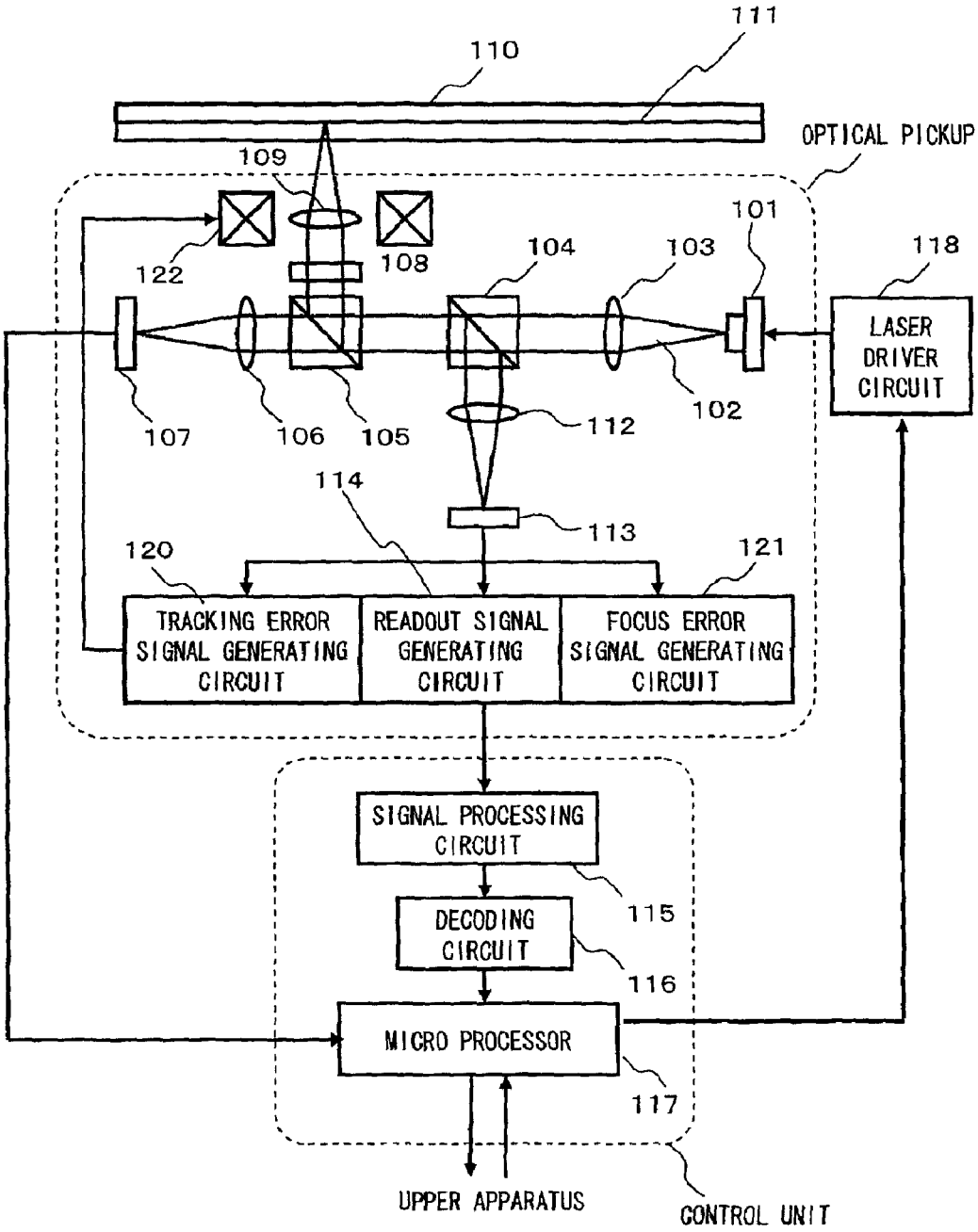
FIG. 5 is a schematic diagram of an optical disc reproduction apparatus to which the present invention is applied.

FIG. 5 is a diagram showing a configuration example of an optical disc reproduction apparatus to which the present invention is applied.

Laser light 102 that is linearly polarizing light is generated from a laser diode 101. It becomes a parallel pencil of light through a collimating lens 103, and then enters a polarizing beam splitter 104. The polarizing beam splitter 104 is an optical element having properties allowing linearly polarizing light in a certain direction to pass therethrough almost without any loss, and causing the linearly polarizing light in a direction perpendicular to the certain direction to be reflected almost without any loss. The polarizing beam splitter 104 is disposed so as to allow the laser light 102 generated from the laser diode 101 to pass therethrough almost without any loss. The laser light 102 having passed through the polarizing beam splitter 104 is reflected by a half mirror 105, and thus the travel direction of laser light 102 is changed vertically. At the same time, the half mirror 105 also allows very small part of the entered laser light to pass therethrough. Accordingly, the laser light 102 having passed through the half mirror 105 is concentrated by a front monitor lens 106 which is located ahead of the half mirror 105, and then enters a front monitor 107 which is located ahead of the front monitor lens 106. The front monitor 107 outputs an electric current proportional to the power of the entered laser light. The electric current outputted by the front monitor 107 is generally used for controlling the power by monitoring it, the power being outputted by the laser diode 101. The laser light 102 reflected by the half mirror 105 is changed to be circularly polarizing light by passing through a quarter-wave plate 108. The laser light 102 which has been changed to the circularly polarizing light is concentrated by an objective lens 109, and then enters an optical disc 110.

The laser light 102 reflected by an information recording surface 111 of the optical disc 110 again passes through the objective lens 109, and then passes through the quarter-wave plate 108, thereby becoming the linearly polarizing light again. In this linearly polarizing light, the polarization direction is perpendicular to the polarization direction for approaching the optical disc 110. For this reason, the laser light 102 is reflected by the half mirror 105, and then reflected by the polarizing beam splitter 104 almost without any loss. Thereafter, the laser light 102 is concentrated by a detection lens 112, and enters a photo detector 113.

Figure 1:
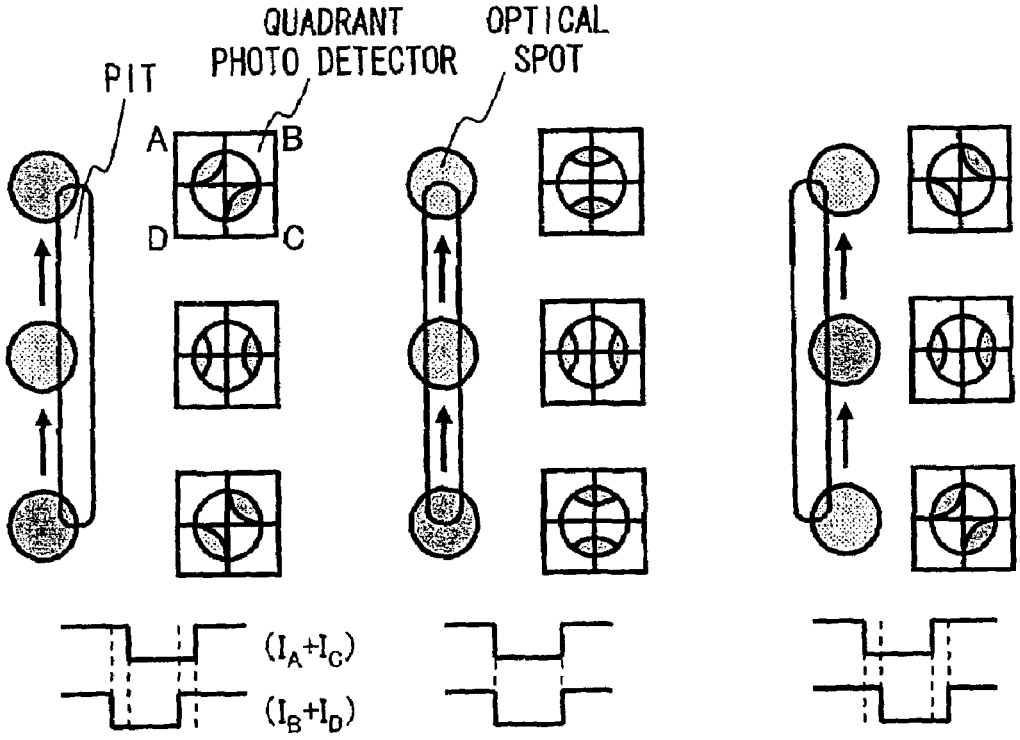
FIG. 1 is a diagram for explaining the principle of a conventional DPD method.
Figure 2:
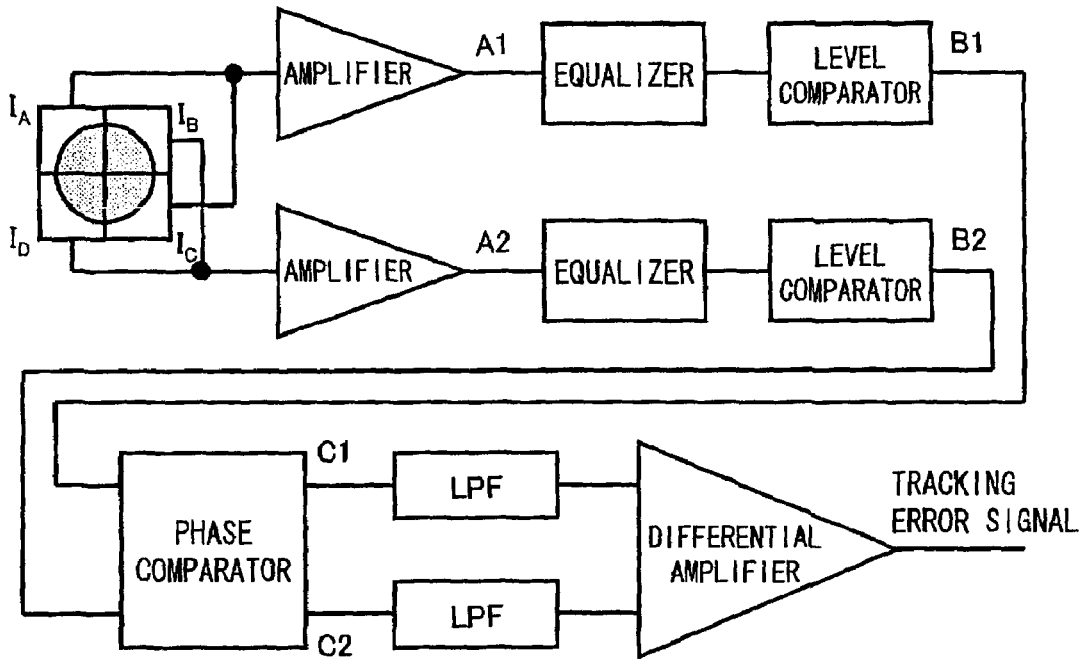
FIG. 2 is a diagram showing a tracking error signal generating block by using a conventional DPD method.
Figure 3:
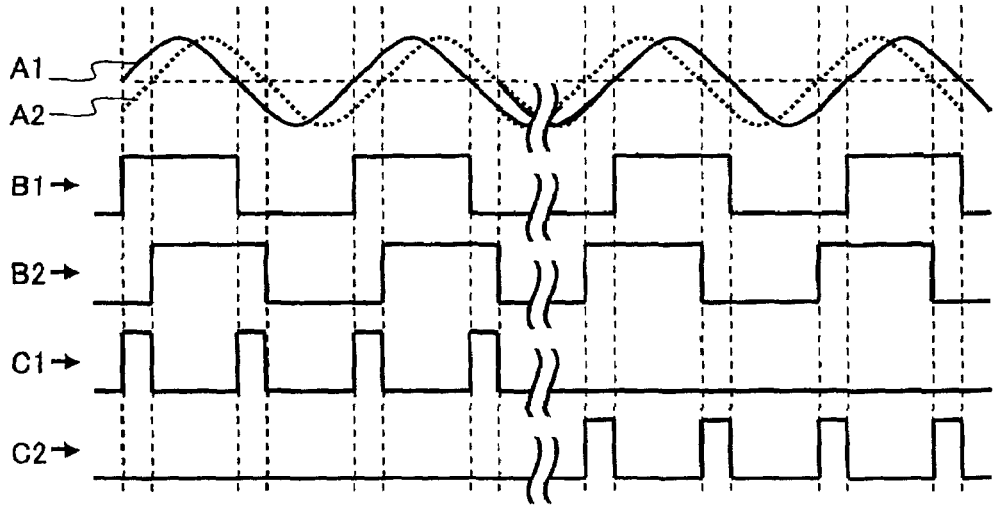
FIG. 3 is a diagram showing signal waveforms in a process where a tracking error signal is generated in the conventional DPD method.
Figure 4:
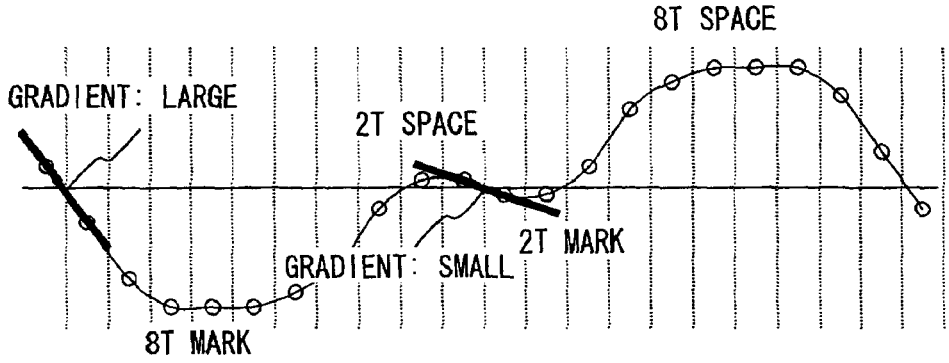
FIG. 4 is a diagram showing a readout signal and the gradients at edges thereof.

The photo detector 113 is a quadrant photo detector as shown in FIG. 1. The output from the photo detector 113 is processed by a readout signal generating circuit 114, a tracking error signal generating circuit 120 and a focus error signal generating circuit 121. Thus, these circuits 114, 120 and 121 generate a readout signal, a tracking error signal and a focus error signal, respectively. The tracking error signal and the focus error signal are supplied to a lens actuator 122, and the lens actuator 122 performs tracking control and focus control by driving the objective lens 109 in a track width direction and in a focus direction. In general, the foregoing configuration except for the optical disc 110 is built up by using an optical pickup as an optical system. The readout signal which is a sum signal of outputs from four segment elements of the quadrant photo detector, is processed to be user data by a signal processing circuit 115 and a decoding circuit 116 of a controlling unit. The user data thus processed is transferred to an upper apparatus via a micro processor 117. The micro processor 117 also monitors the output from the front monitor 107, and controls a laser driver circuit 118 so that the output would become a predetermined value.

Figure 6A:
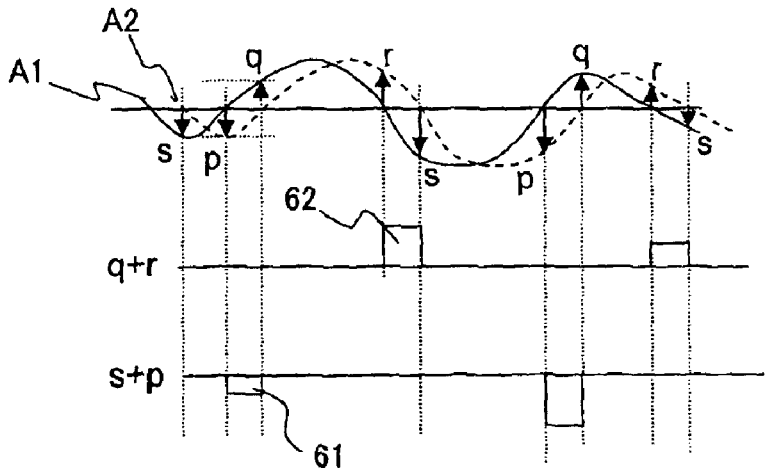
FIGS. 6A and 6B show a tracking error signal generating method according to a first embodiment of the present invention.
Figure 6B:
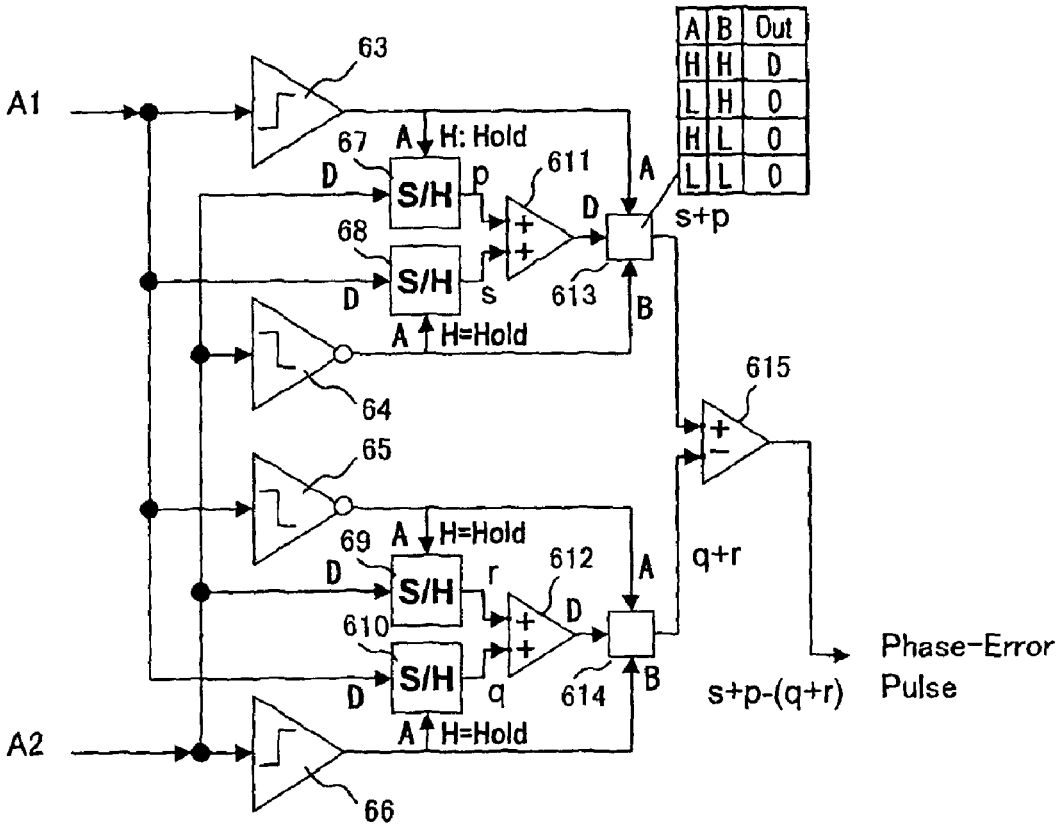

Hereinafter, descriptions will be given of a configuration example of the tracking error signal generating circuit 120 by using FIGS. 6A and 6B. FIG. 6A is a waveform diagram showing two kinds of diagonal sum signals A1=($I_A$+$I_C$) and A2=($I_B$+$I_D$) of the quadrant photo detector, and pulse signals generated from the diagonal sum signals. FIG. 6B is a diagram showing a configuration example of a circuit which generates the pulses shown in FIG. 6A.

A phase difference pulse generating circuit of this embodiment is configured of binarizing circuits, sample/hold circuits, summing circuits, switch circuits and a subtracting circuit. The binarizing circuits 63 and 66 output the binary signals of input signals. The binarizing circuits 64 and 65 output the level inverted signals of the binary signals of the input signals. The sample/hold circuits (S/H) 67, 68, 69 and 610 hold the levels of the input signals D at an edge of a sample/hold signal A until the time when the next edge of the sample/hold signal A comes. The switch circuits 613 and 614 output the input signals D themselves in a case where both signals A and B are at high levels (H), and output zero 0 in the other cases. The subtracting circuit 615 outputs a difference signal indicating the difference between the outputs from the switch circuit 613 and the switch circuit 614.

As shown in FIG. 6A, in this configuration, a phase difference pulse is outputted during a period from an edge time of a signal A1 to the immediately subsequent edge time of a signal A2. In other words, the width of the phase difference pulse is equal to the absolute value of the phase difference between the signals A1 and A2. The height of the pulse is equal to the sum of the signal level of the signal A2 at the edge time (a time at which a signal crosses over the zero level) of the signal A1, and the signal level of the signal A1 at the edge time of the signal A2.

As shown in FIG. 6A, here, assume that p denotes the signal level of the diagonal sum signal A2 at the edge time of the diagonal sum signal A1, and that q denotes the signal level of the signal A1 at the edge time of the signal A2, when the diagonal sum signals A1 and A2 cross over the zero level in the minus-to-plus direction. In addition, assume that r denotes the signal level of the signal A2 at the edge time of the signal A1, and that s denotes the signal level of the signal A1 at the edge time of the signal A2, when the diagonal sum signals A1 and A2 cross over the zero level in the plus-to-minus direction.

In this situation, when the diagonal sum signals cross over the zero level in the minus-to-plus direction, a pulse 61 is outputted during a period from an edge time of the signal A1 to the immediately subsequent edge time of the signal A2 whose phase delays. The signal level of this pulse 61 is equal to the sum (s+p) of the signal level p of the signal A2 at the edge time of the signal A1, which is a pulse starting time, and the signal level s of the signal A1 at the immediately preceding edge time of the signal A2. On the other hand, when the diagonal sum signals cross over the zero level in the plus-to-minus direction, a pulse 62 is outputted during a period from an edge time of the signal A1 to the immediately subsequent edge time of the signal A2. The signal level of this pulse 62 is equal to the sum (q+r) of the signal level r of the signal A2 at the edge time of the signal A1, which is a pulse starting time, and the signal level q of the signal A1 at the immediately preceding edge time of the signal A2. The signs of these two pulses are different from each other. Hence, a tracking error signal is generated by amplifying the difference between these two pulses, that is, the pulse 61 with the signal level (s+p) and the pulse 62 with the signal level (q+r), and then by adding up the differences thus amplified for a certain period of time.

Second Embodiment

Figure 7A:
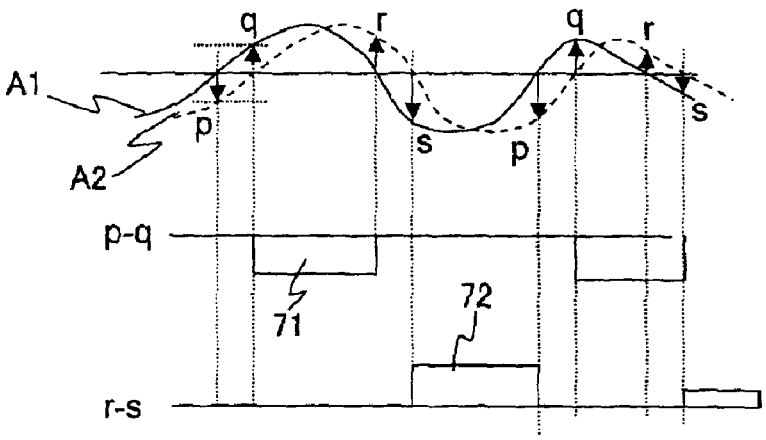
FIGS. 7A and 7B show a tracking error signal generating method according to a second embodiment of the present invention.
Figure 7B:
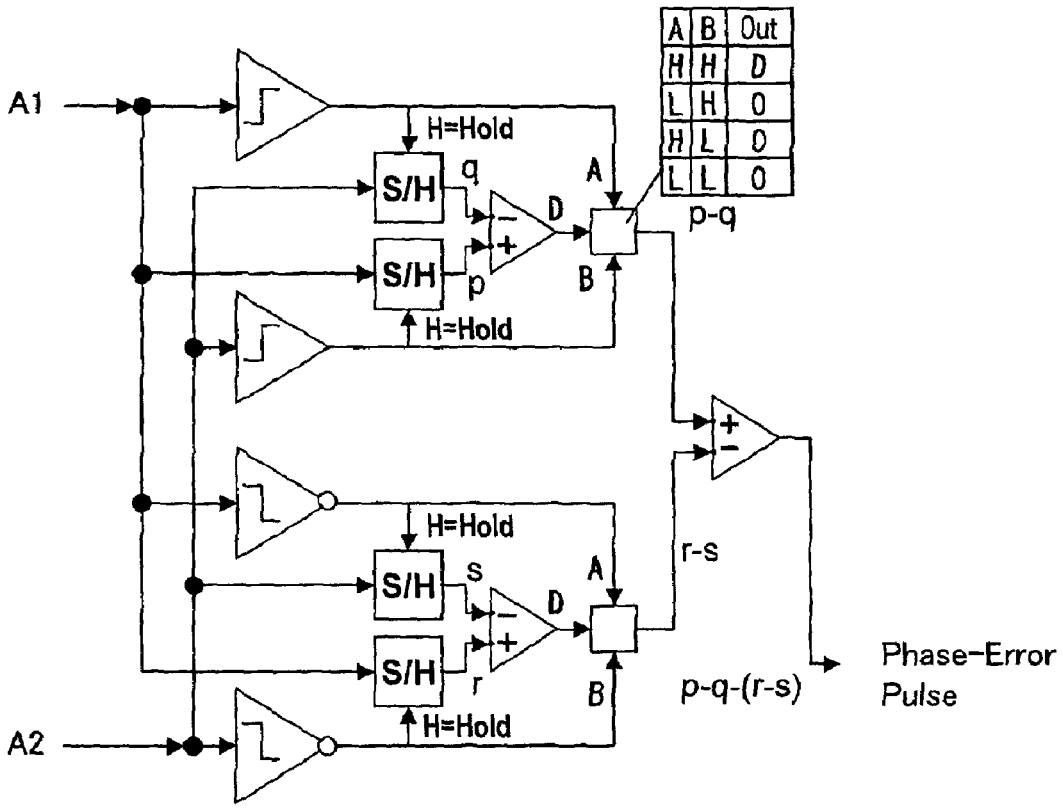

By using FIGS. 7A and 7B, descriptions will be given of another embodiment of a configuration which is based on the basic configuration of the first embodiment, and which is different therefrom only in a tracking error signal generation unit. FIG. 7A is a waveform diagram showing two kinds of diagonal sum signals A1=($I_A$+$I_C$) and A2=($I_B$+$I_D$) of a quadrant photo detector, and pulse signals generated from the diagonal sum signals. FIG. 7B is a diagram showing a configuration example of a circuit which generates the pulses shown in FIG. 7A.

A phase difference pulse generating circuit of this embodiment is configured of binarizing circuits, sample/hold circuits, switch circuits and subtracting circuits. The operations of the binarizing circuits, the sample/hold circuits and the switch circuits are the same as those in a case of the first embodiment.

With this configuration, a phase difference pulse is outputted during a period from an edge time of a signal A2 to the immediately subsequent edge time of a signal A1. In other words, the width of the phase difference pulse is approximately equal to the length of the mark/space following the edge of the signal A2. On the other hand, the height of the phase different pulse is the difference between the signal level of the signal A1 at the edge time of the signal A2, which is a starting time of the phase difference pulse, and the signal level of the signal A2 at the immediately preceding edge time of the signal A1.

As shown in FIG. 7A, here, assume that the signal levels p, q, r and s are defined in the same manner as those shown in FIG. 6A. In this embodiment, when the diagonal sum signals cross over the zero level in the minus-to-plus direction, a pulse 71 is outputted during a period from an edge time of the signal A2 to the immediately subsequent edge time of the signal A1. The signal level of this pulse 71 is equal to the value of (p−q). On the other hand, when the diagonal sum signals cross over the zero level in the plus-to-minus direction, a pulse 72 is outputted during a period from an edge time of the signal A2 to the immediately subsequent edge time of the signal A1. The signal level of this pulse 72 is equal to the value of (r−s). The signs of these two pulses are different from each other. Hence, a tracking error signal is generated by amplifying the difference between these two pulses, that is, the pulse 71 with the signal level (p−q) and the pulse 72 with the signal level (r−s), and then by adding up the differences thus amplified for a certain period of time.

Third Embodiment

Figure 8A:
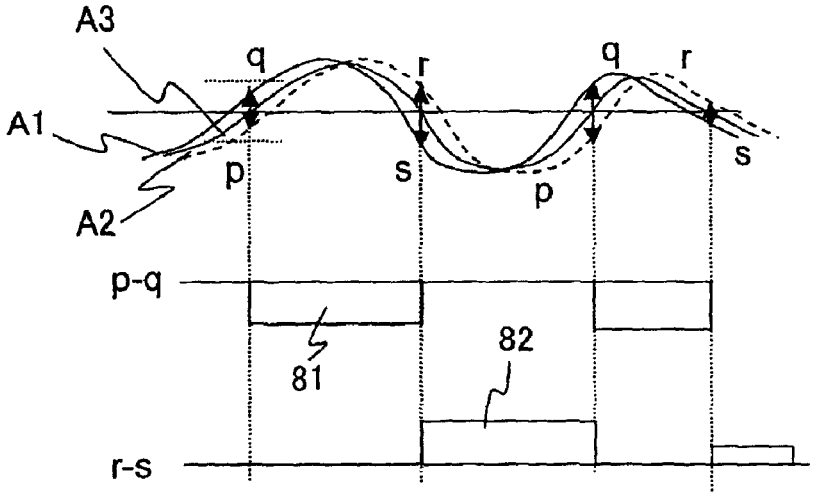
FIGS. 8A and 8B show a tracking error signal generating method according to a third embodiment of the present invention.
Figure 8B:
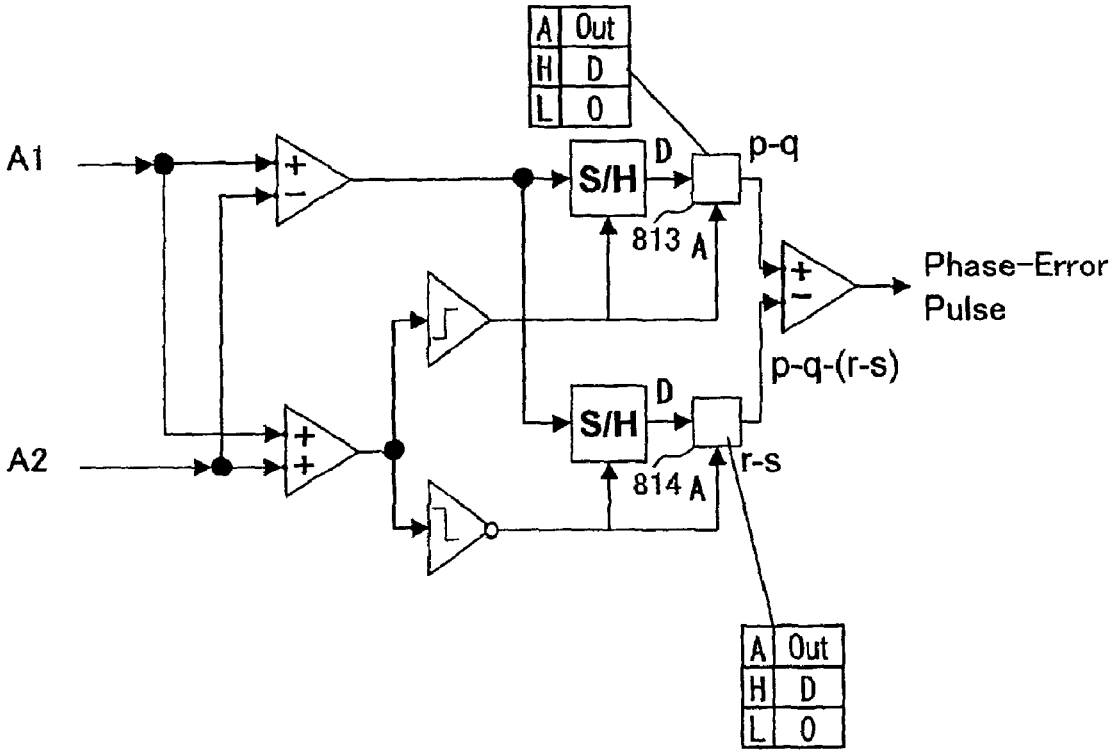

By using FIGS. 8A and 8B, descriptions will be given of another embodiment of a configuration which is based on the basic configuration of the first embodiment, and which is different therefrom only in a tracking error signal generation unit. FIG. 8A is a waveform diagram showing two kinds of diagonal sum signals A1=($I_A$+$I_C$) and A2=($I_B$+$I_D$) of a quadrant photo detector, and pulse signals generated from the diagonal sum signals. FIG. 8B is a diagram showing a configuration example of a circuit which generates the pulses shown in FIG. 8A.

A phase difference pulse generating circuit of this embodiment is configured of binarizing circuits, sample/hold circuits, a summing circuit, a switch circuit and subtracting circuits. The operations of the binarizing circuits, the sample/hold circuits, the subtracting circuits and the summing circuit are the same as those in a case of the first embodiment. The switch circuits 813 and 814 output input signals D themselves in a case where a signal A is at a high level (H), and outputs zero 0 in a case where the signal A is at a low level (L).

With this configuration, an average level signal A3 indicating the average level of the signals A1 and A2 is used, and a phase difference pulse is outputted during a period from a first edge time of the signal A3 to the immediately subsequent edge time of the signal A3. The height of the phase difference pulse is equal to the difference between the signal levels of the signals A1 and A2 at the first edge of the signal A3.

As shown in FIG. 8A, here, when the diagonal sum signals cross over the zero level in the minus-to-plus direction, assume that, at an edge time of the signal A3: the signal level of the signal A1 is q; and the signal level of the signal A2 is p. Moreover, when the diagonal sum signals cross over the zero level in the plus-to-minus direction, assume that, at an edge time of the signal A3: the signal level of the signal A1 is s; and the signal level of the signal A2 is r. At this time, a pulse 81 with the signal level (p−q) is outputted during a period when the signal A3 is plus. On the other hand, a pulse 82 with the signal level (r−s) is outputted during a period when the signal A3 is minus. The signs of these two pulses are different from each other. Hence, a tracking error signal is generated by amplifying the difference between these two pulses, that is, the pulse 81 with the signal level (p−q) and the pulse 82 with the signal level (r−s), and then by adding up the differences thus amplified for a certain period of time.

What is claimed is:

1. An optical disc reproduction method, comprising the steps of:

irradiating reproduction light onto an optical disc on which information is recorded by using a plurality of marks with different mark lengths;

receiving reflected light from the optical disc by a quadrant photo detector;

generating a pulse signal by using a first readout signal and a second readout signal each of which is a sum signal of outputs from segment elements located respectively at diagonal corners of the quadrant photo detector, the pulse signal including information on the phase difference between the first readout signal and the second readout signal, and having at least one of a height and a width weighted according to a mark length of a mark so that the area of the pulse signal would be larger as the mark length of a mark adjacent to an edge of the readout signal becomes longer;

generating a tracking error signal by adding up the pulse signals for a certain period of time; and controlling tracking by using the tracking error signal.

2. The optical disc reproduction method according to claim 1, wherein the pulse signal has the height proportional to the difference between the first readout signal and the second readout signal at signal edges, and has the width proportional to the length of any of a mark and a space following a signal edge.

3. The optical disc reproduction method according to claim 1, wherein the pulse signal has the width from an edge of the first readout signal to the immediately subsequent edge of the second readout signal, and has the height proportional to the sum of the signal level of the second readout signal at the edge time of the first readout signal and the signal level of the first readout signal at the immediately preceding edge of the second readout signal.

4. The optical disc reproduction method according to claim 1, wherein the pulse signal has the width from an edge of the second readout signal to the immediately subsequent edge of the first readout signal, and has the height proportional to the difference between the signal level of the first readout signal at the edge time of the second readout signal, and the signal level of the second readout signal at the immediately preceding edge time of the first readout signal.

5. The optical disc reproduction method according to claim 1, wherein the pulse signal has the width from a point where the average level signal of the first readout signal and the second readout signal crosses over the zero level, to a point where the average level signal again crosses over the zero level next time, and has the size proportional to the difference between the signal levels of the first readout signal and the second readout signal at a starting time of the pulse signal.

6. An optical disc reproduction apparatus comprising:

a light source;

an objective lens;

an irradiation optical system for irradiating an optical disc with light from the light source through the objective lens;

a quadrant photo detector;

a detection optical system for causing light reflected from the optical disc to enter the quadrant photo detector through the objective lens;

a tracking error signal generating circuit for generating a tracking error signal by using a first readout signal and a second readout signal, each of which is a sum signal of outputs from segment elements located respectively at diagonal corners of the quadrant photo detector; and a lens actuator for driving the objective lens by using the tracking error signal generated by the tracking error signal generating circuit, wherein the tracking error signal generating circuit generates a pulse signal by using the first readout signal and the second readout signal, each of which is the sum signal of outputs from segment elements located at diagonal corners of the quadrant photo detector, the pulse signal including information on the phase difference between the first readout signal and the second readout signal, and having at least one of a height and a width weighted according to a mark length of a mark so that the area of the pulse signal would be larger as the mark length of a mark adjacent to an edge of the readout signal becomes longer, and wherein the tracking error signal generating circuit generates a tracking error signal by adding up the pulse signals thus generated for a certain period of time.

7. The optical disc reproduction apparatus according to claim 6, wherein the tracking error signal generating circuit generates a pulse signal having the width from an edge of the first readout signal to the immediately subsequent edge of the second readout signal, and having the height proportional to the sum of the signal level of the second readout signal at the edge time of the first readout signal and the signal level of the first readout signal at the edge time of the second readout signal.

8. The optical disc reproduction apparatus according to claim 6, wherein the tracking error signal generating circuit generates a pulse signal having the width from an edge of the second readout signal to the immediately subsequent edge of the first readout signal, and having the height proportional to the difference between the signal level of the first readout signal at the edge time of the second readout signal and the signal level of the second readout signal at the immediately preceding edge time of the first readout signal.

9. The optical disc reproduction apparatus according to claim 6, wherein the tracking error signal generating circuit generates a pulse signal having the width from a point where an average level signal of the first readout signal and the second readout signal crosses over the zero level, to a point where the average level signal again crosses over the zero level next time, and having the size proportional to the difference between the signal levels of the first readout signal and the second readout signal at a starting time of the pulse signal.

10. An optical apparatus comprising:

a light source;

an objective lens;

an optical system arranged to irradiate light from the light source onto an optical recording medium on which information recorded using a plurality of marks with different lengths, via the objective lens;

a quadrant photo detector arranged to receive light reflected from the optical recording medium, via the objective lens;

a tracking error signal generating circuit to generate pulse signals by using a first readout signal and a second readout signal each of which is a sum signal of outputs from segment elements located respectively at diagonal corners of the quadrant photo detector, each pulse signal including information on a phase difference between the first readout signal and the second readout signal, and having its height or its width weighted according to a mark length of a mark adjacent to an edge of one of the first and second readout signals, and to generate a tracking error signal by adding up the pulse signals for a certain period of time; and a lens actuator arranged to drive the objective lens relative to the optical recording medium by using the tracking error signal.

11. The optical apparatus according to claim 10, wherein the tracking error signal generating circuit generates a pulse signal having the width from an edge of the first readout signal to the immediately subsequent edge of the second readout signal, and having the height proportional to a sum of the signal level of the second readout signal at an edge time of the first readout signal and the signal level of the first readout signal at an edge time of the second readout signal.

12. The optical apparatus according to claim 10, wherein the tracking error signal generating circuit generates a pulse signal having the width from an edge of the second readout signal to the immediately subsequent edge of the first readout signal, and having the height proportional to a difference between the signal level of the first readout signal at an edge time of the second readout signal and the signal level of the second readout signal at the immediately preceding edge time of the first readout signal.

13. The optical apparatus according to claim 10, wherein the tracking error signal generating circuit generates a pulse signal having the width from a point where an average level signal of the first readout signal and the second readout signal crosses over a zero level, to a point where the average level signal again crosses over the zero level next time, and having the size proportional to a difference between the signal levels of the first readout signal and the second readout signal at a starting time of the pulse signal.

14. The optical apparatus according to claim 10, wherein the pulse signal has the height proportional to a difference between the first readout signal and the second readout signal at signal edges, and has the width proportional to the length of any of a mark and a space following a signal edge.

* * * * *